United States Patent [19]

Nilssen

[11] Patent Number: 5,049,787

[45] Date of Patent: Sep. 17, 1991

[54] CONTROLLED ELECTRONIC BALLAST

[76] Inventor: Ole K. Nilssen, Caesar Dr., Barrington, Ill. 60010

[21] Appl. No.: 312,217

[22] Filed: Feb. 21, 1989

Related U.S. Application Data

[63] Continuation-in-part of Ser. No. 80,865, Aug. 3, 1987, Pat. No. 4,819,146, and a continuation-in-part of Ser. No. 730,596, May 6, 1985, abandoned, which is a continuation-in-part of Ser. No. 640,240, Aug. 13, 1984, abandoned, which is a continuation of Ser. No. 412,771, Aug. 30, 1982, abandoned, said Ser. No. 80,865, is a continuation-in-part of Ser. No. 917,788, Oct. 10, 1986, Pat. No. 4,727,470.

[51] Int. Cl.$^5$ ............... H05B 37/02; H05B 39/04; H05B 37/02; G05F 1/00
[52] U.S. Cl. ............... 315/209 R; 315/224; 315/291; 315/307; 315/DIG. 5; 315/DIG. 7
[58] Field of Search ............... 315/DIG. 7, DIG. 5, 315/291, 224, 307, 209 R

[56] References Cited

U.S. PATENT DOCUMENTS 4,079,292 3/1978 Kaneda ............... 315/DIG. 7
4,245,177 1/1981 Schmitz ............... 315/DIG. 7

Primary Examiner—Eugene R. LaRoche
Assistant Examiner—Michael Shingleton

[57] ABSTRACT

A self-oscillating half-bridge inverter is powered from a power-line-operated DC voltage source. The inverter is loaded by way of a series-tuned high-Q LC circuit connected across its output. A pair of fluorescent lamps is series-connected across the tank-capacitor of the LC circuit. The inverter has two bipolar transistors, each driven by an associated saturable current transformer that provides for a transistor ON-time dependent upon the magnitude of an associated bias voltage. One of the transistors has a control arrangement connected in circuit with its associated saturable transformer and operative to control the magnitude of its associated bias voltage. As the magnitude of this bias voltage is controlled, the magnitude of the voltage across the tank-capacitor, as well as of the current available therefrom, is correspondingly controlled. The magnitude of the bias voltage is automatically controlled such that: (a) with the lamps not-yet-ignited, the magnitude of the voltage across the tank-capacitor is maintained at a level somewhat higher than normal lamp operating voltage, except that for 10 milli-seconds once each second the magnitude is increased to a level high enough to cause lamp ignition; (b) after the lamps have ignited, the magnitude of the lamp current is limited to an adjustably preset level; and (c) the magnitude of any ground-fault current is limited to a level considered safe from shock hazard.

24 Claims, 2 Drawing Sheets

CONTROLLED ELECTRONIC BALLAST

RELATED APPLICATIONS

Instant application is a continuation-in-part of Ser. No. 07/080,865 filed Aug. 3, 1987, now U.S. Pat. No. 4,819,146; which Ser. No. 07/080,865 is a continuation-in-part of Ser. No. 06/917,788 filed Oct. 10, 1986, now U.S. Pat. No. 4,727,470.

Instant application is also a continuation-in-part of Ser. No. 06/730,596 filed May 6, 1985, now abandoned; which is a continuation-in-part of Ser. No. 06/640,240 filed Aug. 13, 1984, now abandoned; which is a continuation-in-part of Ser. No. 06/412,771 filed Aug. 30, 1982, now abandoned.

BACKGROUND OF THE INVENTION

1. Field of the Invention

The present invention relates to ground-fault-protected series-resonance-loaded inverters, particularly as used for controllably powering gas discharge lamps.

2. Description of Prior Art

Ballasts with built-in ground-fault-protection means have been previously described, such as in U.S. Pat. No. 4,563,719 to Nilssen.

Ballasts using a series-resonance-loaded output have also been previously described, such as in U.S. Pat. No. 4,370,600 to Zansky.

In an inverter where a gas discharge lamp load is parallel-connected across the tank capacitor of a high-Q LC circuit that is resonantly series-excited by a high-frequency voltage output of the inverter, it is necessary to provide some means to protect against the high currents and voltages resulting due to so-called Q-multiplication whenever the lamp load is removed or otherwise fails to constitute a proper load for the LC circuit.

In U.S. Pat. No. 4,370,600 to Zansky, circuit protection is provided by way of providing to the LC circuit an alternative load in the form of a voltage-clamping means; which voltage-clamping means acts to load the LC circuit during any period when the lamp does not constitute a proper load therefor.

The voltage-clamping is accomplished by rectifying the Q-multiplied voltage output of the LC circuit and by applying the resulting DC output to the inverter's DC power source.

However, during any period when voltage-clamping does occur, a relatively large amount of power circulates within the electronic ballast means: from the inverter's output, through the LC circuit, and back into the inverter's DC power source by way of the voltage-clamping means.

SUMMARY OF THE INVENTION

Objects of the Invention

One object of the present invention is that of providing for a cost-effective ballasting means for powering gas discharge lamps.

Another object is that of providing for control means in a series-resonance-loaded inverter ballast.

These as well as other objects, features and advantages of the present invention will become apparent from the following description and claims.

Brief Description

A self-oscillating half-bridge inverter is powered from a power-line-operated DC voltage source. The inverter is loaded by way of a series-tuned high-Q LC circuit connected across its output. A pair of fluorescent lamps is series-connected across the tank-capacitor of the LC circuit. The inverter has two bipolar transistors, each driven by an associated saturable current transformer that provides for a transistor ON-time dependent upon the magnitude of an associated bias voltage.

One of the transistors has a control arrangement connected in circuit with its associated saturable transformer and operative to control the magnitude of its associated bias voltage. As the magnitude of this bias voltage is controlled, the magnitude of the voltage across the tank-capacitor, as well as of the current available therefrom, is correspondingly controlled.

The magnitude of the bias voltage is automatically controlled such that: (a) with the lamps not-yet-ignited, the magnitude of the voltage across the tank-capacitor is maintained at a level somewhat higher than normal lamp operating voltage, except that for 10 milli-seconds once each second the magnitude is increased to a level high enough to cause lamp ignition; (b) after the lamps have ignited, the magnitude of the lamp current is limited to an adjustably preset level; and (c) the magnitude of any ground-fault current is limited to a level considered safe from shock hazard.

As a consequence of not having to provide, on a continuous basis, an output voltage of magnitude large enough to cause lamp ignition, the cost and weight of the tank-inductor and the tank-capacitor of the LC circuit may be reduced by a considerable factor.

DESCRIPTION OF THE PREFERRED EMBODIMENT

Details of Construction

Figure 1:
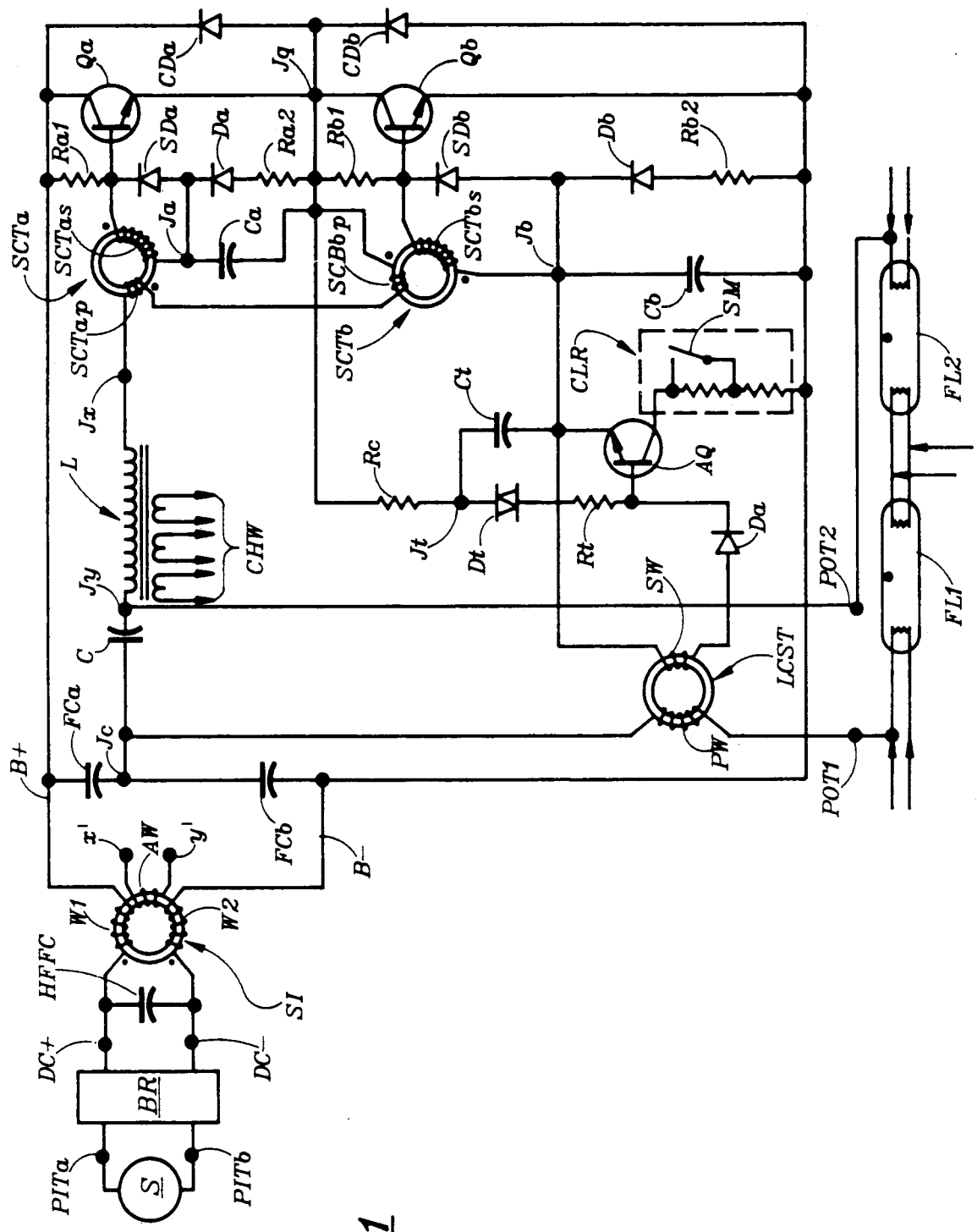
FIG. 1 provides a basic electrical circuit diagram of the preferred embodiment of the invention.

In FIG. 1, a source S of ordinary 120 Volt/60 Hz power line voltage is applied to power input terminals PITa and PITb; which terminals, in turn, are connected with a bridge rectifier BR. The DC output from bridge rectifier BR is applied to a DC+ terminal and a DC− terminal, with the DC+ terminal being of positive polarity. A high-frequency filter capacitor HFFC is connected between the DC+ terminal and the DC− terminal. A first winding W1 of an EMI suppression inductor SI is connected between the DC+ terminal and a B+ bus; and a second winding W2 of EMI suppression inductor SI is connected between the DC− terminal and a B− bus.

An auxiliary winding AW is wound on EMI suppression inductor SI; which auxiliary winding has output terminals x' and y'.

A filter capacitor FCa is connected between the B+ bus and a junction Jc; a filter capacitor FCb is connected between junction Jc and the B− bus. A switching transistor Qa is connected with its collector to the B+ bus and with its emitter to a junction Jg; a switching transistor Qb is connected with its collector to junction Jg and with its emitter to the B− bus. A commutating diode CDa is connected between the B+ bus and junction Jg, with its cathode connected with the B+ bus; a commutating diode CDb is similarly connected between junction Jg and the B− bus.

A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb, respectively, have primary windings SCTap and SCTbp; which primary windings are series-connected between junction Jg and a junction Jx.

A resistor Ra1 is connected between the collector and the base of transistor Qa; a resistor Rb1 is connected between the collector and the base of transistor Qb. A capacitor Ca is connected between junction Ja and the emitter of transistor Qa; a capacitor Cb is connected between junction Jb and emitter of transistor Qb. A diode Da is connected with its cathode to junction Ja and, by way of a leakage resistor Ra2, with its anode to the emitter of transistor Qa; a diode Db is connected with its cathode to junction Jb and, by way of a leakage resistor Rb2, with its anode to the emitter of transistor Qb. A shunt diode SDa is connected between the base of transistor Qa and junction Ja, with its anode connected with junction Ja; a shunt diode SDb is similarly connected between the base of transistor Qb and junction Jb.

An auxiliary transistor AQ is connected with its emitter to junction Jb and with its collector to the B− bus by way of a current-limiting resistor CLR; which current-limiting resistor is switch-adjustable by way of a switch means SM.

A tank-inductor L is connected between junction Jx and a junction Jy; and a tank-capacitor C is connected between junctions Jy and Jc. A power output terminal POT1 is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2. Tank-inductor L has three cathode heater windings CHW; which are connected with the cathodes of fluorescent lamps FL1 and FL2.

A capacitor Ct is connected between junction Jb and a junction Jt. A Diac Dt is series-connected with a resistor Rt to form a series-combination, which series-combination is connected between junction Jt and the base of transistor AQ. A resistor Rc is connected between junctions Jg and Jt.

A secondary winding SW of transformer LCST is connected between the emitter of auxiliary transistor AQ and the anode of a diode Da, whose cathode is connected with the base of transistor AQ.

Details of Operation

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a substantially squarewave voltage of controllable frequency and with peak-to-peak magnitude about equal to that of the instantaneous magnitude of the DC voltage present between the B− bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, the magnitude of the negative voltage on capacitors Ca and Cb is determined by the magnitude of the current provided to the bases of transistors Qa and Qb, less any current drained away through resistors R2a and Rb2/CLR, all respectively. (Of course, a small amount of current is also drained away from bias capacitors Ca and Cb by resistors Ra1 and Rb1, respectively. However, this amount of charge leakage is in most situations negligible. Resistors Ra1 and Rb1 are principally used for getting the inverter to initiate oscillation.)

The magnitude of the base current provided to each transistor is directly proportional to the magnitude of the current flowing through the primary windings of saturable current transformers SCTa and SCTb. Thus, assuming transistor AQ to be conducting, for given values of resistors Ra2 and Rb2/CLR: the higher the magnitude of the inverter's output current, the higher the magnitude of the negative voltage on capacitors Ca and Cb.

Thus, for given values of Ra2 and Rb2/CLR, the circuit of FIG. 1 provides for a high degree of automatic regulation of the magnitude of the inverter's output current.

By selecting a suitable resistance value for resistor Ra2, and assuming transistor AQ to be conducting, the magnitude of the inverter's output current may be adjusted by adjusting the resistance value of CLR by way of switch means SM: a relatively low resistance value leads to an inverter output current of relatively high magnitude; a relatively high resistance value leads to an inverter output current of relatively low magnitude.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor is increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

More particularly, the circuit and control arrangement of FIG. 1 operates as follows.

As power is applied at power input terminals PIT1/PIT2, the inverter starts to oscillate at a frequency near the natural self-resonance frequency of the LC circuit. The resulting inverter output current results in a positive feedback current provided to each base; and this feedback current, in turn, causes a negative bias to build up on each of bias capacitors Ca/Cb. As the magnitude of the negative bias voltage increases, the inverter's oscillation frequency increases as well. As a result, the magnitude of the inverter output current will stabilize at a some level determined by the effective resistance values of resistors Ra2 and Rb2/CLR.

With the fluorescent lamps non-connected or otherwise non-functional, transistor AQ is effectively non-conducting; and under this condition the magnitude of the high-frequency (30 kHz or so) inverter current stabilizes at a level determined by the resistance values of resistors Ra2 and Rb2.

With the fluorescent lamps connected and fully operating (i.e., fully loading the LC circuit), transistor AQ is conducting by virtue of the current provided to its base by way of lamp current sensing transformer LCST. Under this condition the magnitude of the high-frequency current stabilizes at a level effectively determined by the resistance values of resistors Ra2 and CLR—the resistance value of Rb2 being much higher than that of CLR.

More particularly, the resistance value of resistor Ra2 is selected such that the ON-time of transistor Qa corresponds to nearly a 50% duty-cycle; the resistance value of Rb2 is then selected such as to result in an inverter output current of magnitude such as to provide for a high-frequency voltage across the tank-capacitor that is approximately equal in magnitude to that of the voltage across the fluorescent lamps under normal full-power lamp operation; and the resistance value of resistor CLR is then selected such as to provide for the proper magnitude of the lamp operating current.

Under the condition of normal lamp loading of the LC circuit, the RMS magnitude of the voltage provided to the lamp cathodes is so selected as to provide for proper cathode heating. Thus, as the circuit is initially powered, even though the lamps have not yet ignited, the cathodes are provided with a heating voltage of RMS magnitude appropriate for cathode heating; yet, the magnitude of the high-frequency voltage then provided across the lamps is too low to cause lamp ignition. However, by action of the trigger arrangement consisting of elements Rc, Ct, Dt and Rt, after about one second (and once each second thereafter), a current pulse of about 10 milli-second duration will be provided to the base of transistor AQ, thereby making this transistor conduct for a period of about 10 milli-seconds. During this 10 milli-second period, the magnitude of the high-frequency voltage across the tank-capacitor will increase substantially, and the lamps will ignite.

During the 10 milli-second period, the magnitude of the cathode heating voltages also increases substantially, thereby aiding in lamp ignition. However, on an integrated RMS basis, this brief period of increased cathode heating voltage is of little consequence.

As soon as the lamps ignite, lamp current will start to flow; and, by way of transformer LCST, transistor AQ will now be conducting on a nearly continuous basis. This implies that the 10 milli-second pulses that will continue to be provided every second or so will be of little consequence.

If the lamps were to be disconnected, however, the repeatedly provided 10 milli-second pulses will assure that affirmative lamp ignition will occur as soon as fully functional lamps are indeed connected.

As long as transistor AQ is conductive, the fluorescent lamps will be powered in a normal manner; and the magnitude of the lamp current flowing will depend on the particular setting of adjustable resistor CLR. With switch means SM closed, the magnitude of the lamp current will be relatively large; with switch means Sm open, the magnitude of the lamp current will be relatively low.

In case of a ground-fault condition—which typically might occur if fluorescent lamp FL2 were to be connected at its one end with power output terminal POT2 while a ground-connected person held onto the lamp's terminals at its other end—high-frequency current would flow out from the ballast at terminal POT2, through the lamp and the person to ground, and then eventually back to the ballast by way of one or both of the power input terminals (PIT1/PIT2. However, since necessarily this condition would require that lamp current stop flowing through lamp current sensing transformer LCST, transistor AQ would cease to conduct and the magnitude of any current then flowing from output terminal POT2 would be limited to a level that is substantially lower than that of full-power lamp current. In particular, the magnitude of the resulting ground-fault current will only be on the order of 30 milli-Ampere; which is a level that—at a frequency of 30 kHz or so—is considered by authoritative entities, such as Underwriters Laboratories, Inc. of Northbrook, Ill., as being substantially non-hazardous.

Figure 2:
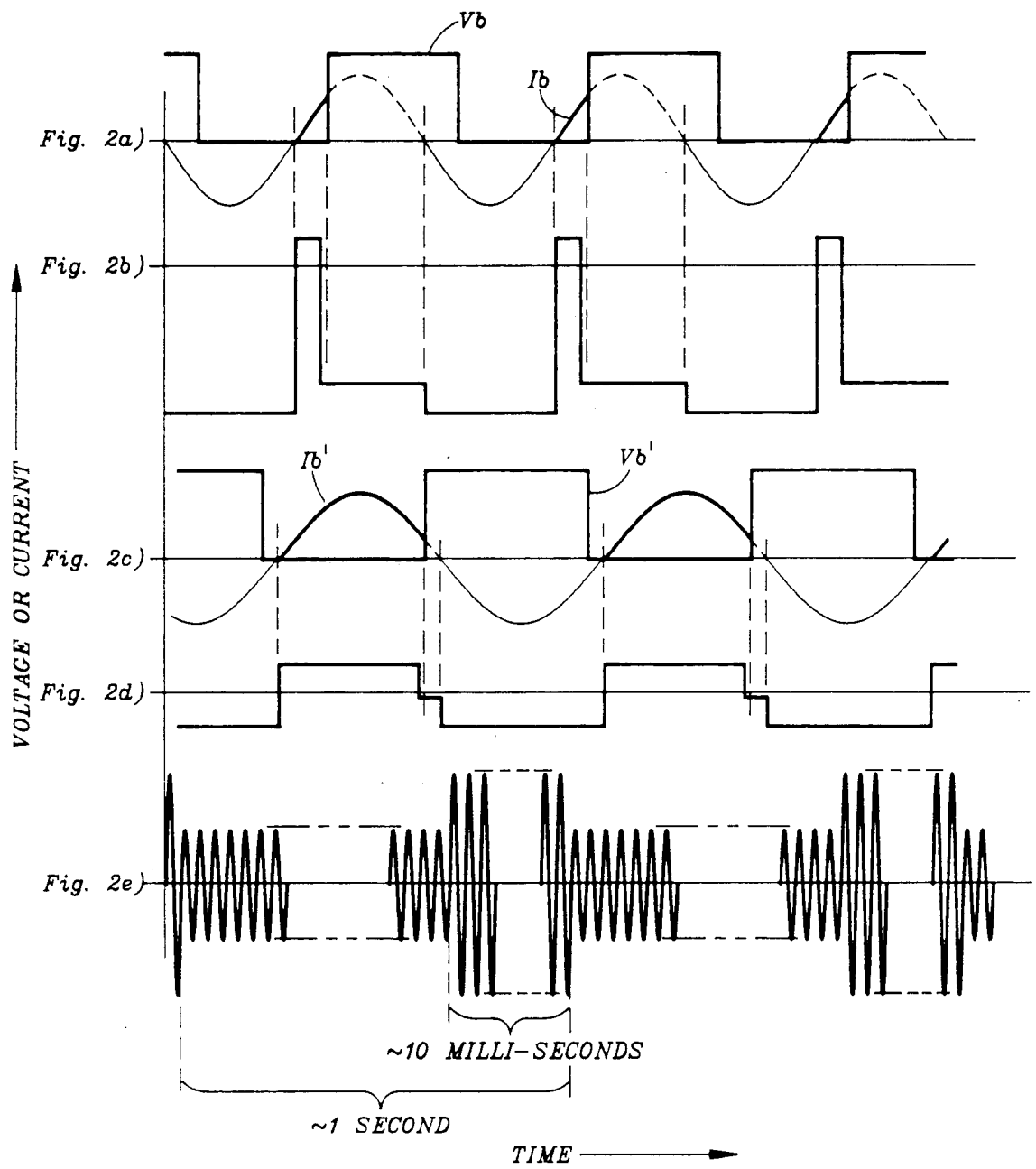
FIG. 2 illustrates waveshapes of various high frequency voltages and currents present within the circuit during different modes of operation.

FIG. 2 depicts various voltage and current waveforms associated with the circuit of FIG. 1.

For a situation with no loading presented to the high-Q LC circuit—that is, with the lamps disconnected, or before the lamps have ignited—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDa is showed in light dashed line, and the part of Ib flowing through either Qa or CDb is shown in light solid line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDa is showed in light dashed line, and the part of Ib' flowing through either Qa or CDb is shown in light solid line.

FIG. 2d shows the base-emitter voltage of transistor Qb as it corresponds to the waveforms of FIG. 2c.

FIG. 2e shows the waveshape of the high-frequency voltage present across the tank-capacitor under the condition of an unloaded LC circuit: a continuous substantially sinusoidal voltage of a relatively low magnitude, interrupted once each second with a 10 milli-second long burst of relatively high-magnitude substantially sinusoidal voltage.

Additional Comments (a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

(b) The instantaneous peak-to-peak magnitude of the squarewave output voltage provided by the half-bridge inverter between junctions Jg and Jc is substantially equal to the instantaneous magnitude of the DC supply voltage.

(c) Saturable current transformers SCTa and SCTb require only a miniscule amount of voltage across their primary windings. Hence, the magnitude of the voltage-drop between junctions Jg & Jx is substantially negligible, and the inverter's full output voltage is therefore effectively provided across the LC circuit, which consists of tank-capacitor C and tank-inductor L.

(d) In FIG. 2, the inverter frequency associated with the waveforms of FIGS. 2a and 2b is substantially higher than that associated with FIGS. 2c and 2d.

Also, current Ib is nearly 180 degrees out of phase with the fundamental frequency component of voltage Vb, while current Ib' is almost in phase with voltage Vb'.

(e) In the situation associated with the waveform of FIG. 2b, the magnitude of the voltage "seen" by the secondary winding of saturable current transformer SCTb is about five times as high as that "seen" by the same secondary winding in the situation associated with FIG. 2d.

Correspondingly, the duration of the transistor ON-time in the situation associated with FIG. 2d is about five times longer than the transistor ON-time in the situation associated with the waveform of FIG. 2b.

(f) As may be noticed in FIG. 2a, transistor Qb ceases to conduct in its forward direction while a substantial amount of current is still flowing from the inverter's output. After transistor Qb has ceased to conduct, the inverter's output current will continue to flow until the energy in the tank inductor has dissipated itself. However, the output current will continue its flow through commutating diode CDa, thereby discharging its energy into the DC power supply.

(g) Forward conduction of a transistor is defined as current flowing, with the aid of forward base drive current, directly between the collector and the emitter; which, in case of transistor Qb for instance, means that forward current is defined as positive current flowing from its collector to its emitter while drive current is being provided to its base.

A transistor's ON-time is defined as the period during which it conducts current in the forward direction.

(h) In FIG. 2 it is noted that the fundamental frequency of the waveforms depicted in FIGS. 2c and 2d is lower by a certain factor as compared with the frequency associated with the waveforms of FIGS. 2a and 2b; yet the indicated duration of transistor ON-time associated with the waveforms of FIGS. 2a and 2b is shorter by a much larger factor as compared with the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion. In instant case, with each transistor's ON-time shortened by a factor of about five, the inverter frequency increased only by a factor of about 1.3: from about 30 kHz to about 40 kHz.

(i) The time constant associated with each bias capacitor and its associated leakage resistance means is normally longer than a complete cycle of the high frequency inverter output voltage, and it is typically on the order of several such complete cycles. For instance, for a situation where the power line input voltage is 120 Volt/60 Hz, the frequency of the inverter output voltage/current is on the order of 30 kHz, and the total inverter power output falls in the range between 10 and 100 Watt, the values of bias capacitors Ca and Cb might reasonably be in the range from one to ten micro-Farad, the value for leakage resistor Ra2 might reasonably be in the range between 10 and 100 Ohm, and adjustable resistor CLR might reasonably be adjustable over a range between 2 and 100 Ohm.

Thus, in general, the magnitude of the bias voltage on the bias capacitors is responsive to the average magnitude of the inverter's output current—normally as averaged over at least a full cycle of this output current.

(j) With power input terminals PIT1 and PIT2 connected with an ordinary electric utility power line, all electrical parts of the circuit arrangement of FIG. 1 are effectively connected with earth ground by way of those power input terminals.

(k) Although not expressly shown in FIG. 1, it is emphasized that fluorescent lamps FL1 and FL2 are connected with terminals POT1 and POT2 by way of lamp socket means of a type that has electrical terminal means that are non-accessible to a person's fingers or the like. However, the terminal means of the fluorescent lamps are of a type that does permit a person to touch them directly, provided they are not inserted into their sockets.

Thus, in a situation where the circuit arrangement of FIG. 1 is used as a fluorescent lamp ballasting means, and under otherwise ordinary circumstances, the only way that a person is able to get exposed to a ground-fault current from the circuit arrangement of FIG. 1 is by holding on to the terminals at one end of a fluorescent lamp while inserting the other end into a lamp socket connected with the POT2 or the "hot" terminal.

(l) In the circuit arrangement of FIG. 1 there are two distinctly different kinds of current-magnitude-limiting provided. One is the ordinary kind associated with the natural characteristics of a series-excited parallel-loaded resonant LC circuit; another is due to the action of the control circuit associated with auxiliary transistor AQ.

The former is the principal means for limiting the lamp current; the latter is the principal means for limiting the output current in the absence of proper circuit loading.

(m) Due to basic factors related to magnetic hysteresis and leakage iductance, lamp current sensing transformer LCST requires the lamp current to have a certain minimum magnitude before producing an output signal of magnitude adequate to cause auxiliary transistor AQ to become conductive. Hence, there is a minimum threshold level automatically built into the control means used for sensing lamp current. This threshold level may readily be changed, for instance by changing the number of turns on primary winding PW, or by placing a shunting impedance across secondary winding SW.

(n) In the control circuit related to and including auxiliary transistor AQ, there are to main control effects: (i) one associated with the fact that the magnitude of the bias voltage on capacitor Cb tends to vary around an average level as a function of the average absolute magnitude of the inverter's output current, and (ii) one associated with the fact that the average level around which the bias voltage varies may itself be varied, such as by varying the magnitude of the base current provided to auxiliary transistor AQ.

(o) Without any substantial loading on the LC circuit, its Q-factor is quite high, and—absent proper control measures—the magnitude of the voltage developing across the tank-capacitor tends to become destructively high.

A large-magnitude voltage across the tank-capacitor must by necessity be associated with an inverter output current of correspondingly large magnitude. However, a large-magnitude inverter output current will cause a correspondingly high-magnitude negative bias on both bias capacitors, but—absent lamp current of magnitude sufficient to place transistor AQ into conduction—particularly on bias capacitor Cb: the two bias capacitors have to provide a positive current of magnitude proportional to the average absolute magnitude of the inverter's output current; which means that the magnitude of the negative bias voltage will have to increase with increasing magnitude of the inverter output current.

It is this negative feedback feature, which relates to negative feedback of the rectified average magnitude of the inverter's output current, that provides for stable controllable operation of a self-oscillating inverter whose output is connected across an unloaded high-Q series-connected LC circuit.

(p) In fact, the circuit arrangement of FIG. 1 may be defined as an inverter that is loaded by way of a high-Q tuned LC circuit and arranged to self-oscillate by way of positive feedback derived from the inverter's instantaneous output current (and/or voltage) while at the same time arranged to provide for controllable-magnitude output current (and/or voltage) by way of negative feedback derived from the average absolute magnitude of the inverter's output current (and/or voltage).

(q) So as to fully reset the saturable cores each cycle, diodes SDa and SDb should each have a relatively high-magnitude forward voltage drop, such as might be obtained by using two ordinary diodes in series. However, instead of using special diodes with high-magnitude forward voltage drops, it is acceptable to use ordinary diodes with added series-resistors, thereby effectively to increase their forward voltage drops.

(r) The magnitude of the relatively high-magnitude high-frequency voltage of FIG. 2e may be established by various means, such as by properly sizing the resistance value of resistor Rt.

(s) Some of the values associated with operating the ballast with the kind of waveform indicated by FIG. 2e are as follows: (i) substantially relaxed specifications for the tank-inductor; (ii) similarly relaxed specifications for the tank-capacitor; (iii) reduced glow current prior to lamp ignition, thereby providing for increased lamp life; (iv) much improved lamp starting; (v) substantially reduced idling power; and (vi) more cost-effective compliance with U.L. specifications related to ground-fault current.

(t) The RMS magnitude of the cathode heating voltage, which voltage is provided to each of the lamps' thermionic cathodes by way of cathode heating windings CHW, is such as to provide for proper cathode heating during the period before the lamps ignite, as well as on a continuous basis thereafter.

During the brief pulses provided by way of elements Rc, Ct, Dt and Rt, the RMS magnitude of the cathode heating voltage is increased to about twice normal value. However, since the duration of each of these pulses is so very brief (about 10 milli-seconds) compared with the duration of each of the periods between such pulses (about 1000 milli-seconds), the net effect on the temperature of the cathodes is negligible. However, with respect to lamp ignition, the effect is substantial and beneficial. The briefly elevated RMS magnitude of the cathode voltage gives rise to ionization of the lamp gas along the cathodes' surfaces, thereby greatly facilitating the ignition of the main gas columns of the lamps.

(u) While the RMS magnitude of the high-frequency output voltage, as provided at output terminals POT1-/POT2, may indeed be determined by appropriate choice of resistor Rt, the resulting magnitude is highly dependent on the gain of transistor AQ.

To eliminate such dependence, an additional auxiliary transistor may be placed in parallel with transistor AQ; which additional transistor would have its emitter connected with junction Jb and its collector connected with the B— bus by way of a separate resistor. Then, resistor Rt would be connected with the base of this additional transistor instead of to the base of transistor AQ. The resistance value of the separate resistor would then be chosen such as to provide for the desired RMS magnitude of the high-frequency output voltage; whereas the value of resistor Rt would now be chosen such as to provide adequate base current to bring transistor AQ into a fully conductive state.

(v) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
a source providing a manifestly current-limited AC voltage at an AC output; the frequency of the AC voltage being substantially higher than the frequency of the power line voltage on an ordinary electric utility power line; the source having a control input; the AC voltage having an RMS magnitude; the source having control means operative, on receipt of an action at the control input, to affect said RMS magnitude;
connect means operative to permit connection of a gas discharge lamp means with said AC output; and
control means connected with the control input; the control means being operative, provided said gas discharge lamp means is not connected with the AC output, to provide said action in such manner as to cause the RMS magnitude to be modulated at a modulation frequency lower than the frequency of the power line voltage.

2. The arrangement of claim 1 wherein the frequency of the AC voltage is substantially higher than that of the power line voltage.

3. The arrangement of claim 1 wherein: (i) the RMS magnitude is modulated between a relatively low RMS magnitude and a relatively high RMS magnitude; and (ii) the relatively high RMS magnitude is approximately twice as large as the relatively low RMS magnitude.

4. The arrangement of claim 1 wherein the modulation frequency is higher than one cycle per minute but lower than ten cycles per second.

5. The arrangement of claim 4 wherein the modulation frequency is approximately equal to about one cycle per second.

6. The arrangement of claim 1 wherein, a brief period after said gas discharge lamp is indeed connected with the AC output, the RMS magnitude ceases to be modulated.

7. The arrangement of claim 6 wherein said brief period has a duration of about one second.

8. The arrangement of claim 1 in actual combination with said gas discharge lamp.

9. The arrangement of claim 1 wherein the control means is additionally operative to permit control of the maximum magnitude of any current flowing from the AC output.

10. The arrangement of claim 9 wherein the control means comprises adjustment means operative to permit manual adjustment of said maximum magnitude.

11. An arrangement comprising:
a source of electric power; and
a ballast means connected with the source of electric power and operative to provide an AC voltage at an AC output; the AC voltage being of frequency subsequently higher than the frequency of the power line voltage on an ordinary electric utility power line; the ballast means being operative to power a gas discharge lamp connected with the AC output; the AC voltage being characterized by: (i) whenever the gas discharge lamp is indeed connected with the AC output and powered therefrom, being of a substantially constant RMS magnitude; and (ii) whenever the gas discharge lamp is not so connected, periodically varying, at a frequency lower than that of the power line voltage, between a minimum relatively low RMS magnitude and a maximum relatively high RMS magnitude.

12. The arrangement of claim 11 wherein said minimum relatively low RMS magnitude is approximately equal to said substantially constant RMS magnitude.

13. The arrangement of claim 11 wherein said maximum relatively high RMS magnitude is more than about 50% larger than said substantially constant RMS magnitude.

14. The arrangement of claim 11 wherein, whenever the discharge lamp is not connected with the AC output and powered therefrom, the AC voltage is amplitude-modulated at a frequency substantially lower than 60 Hz.

15. An arrangement comprising:
a source of electric power;
a gas discharge lamp; and
a ballast means connected with the source of electric power and operative to provide an AC voltage at an AC output; the fundamental frequency of the AC voltage being substantially higher than that of the power line voltage on an ordinary electric utility power line; the gas discharge lamp being connected with the AC output and operative to be properly powered by the AC voltage provided thereat; the AC voltage being characterized by: (i) before the gas discharge lamp has ignited, having an RMS magnitude periodically alternating, at a frequency lower than the fundamental frequency of the power line voltage, between a relatively low minimum RMS magnitude and a relatively high maximum RMS magnitude; and (ii) after the gas discharge lamp has ignited, being of a substantially constant RMS magnitude.

16. The arrangement of claim 15 wherein said relatively high maximum RMS magnitude is larger that said relatively low minimum magnitude RMS magnitude by at least one third.

17. An arrangement comprising:
a source of electric power;
a gas discharge lamp; and
a ballast means connected with the source of electric power and operative to provide an AC voltage at an AC output; the fundamental frequency of the AC voltage being substantially higher than that of the power line voltage on an ordinary electric utility power line; the gas discharge lamp being connected with the AC output and operative to be properly powered by the AC voltage provided thereat; the AC voltage being characterized by: (i) before the gas discharge lamp has ignited, periodically varying at a frequency lower than about 60 Hz between a relatively low RMS magnitude and a relatively high RMS magnitude; and (ii) after the gas discharge lamp has ignited, being of a substantially constant RMS magnitude.

18. The arrangement of claim 17 wherein said relatively low RMS magnitude is about equal to said substantially constant RMS magnitude.

19. The arrangement of claim 17 wherein said first period of time is substantially longer than said second period of time.

20. The arrangement of claim 17 wherein said relatively low RMS magnitude is insufficiently high to cause lamp ignition.

21. An arrangement comprising:
a source providing an ordinary power line voltage at a pair of source terminals; and
frequency-converting ballast means connected with the source terminals and operative to provide an AC voltage at an AC output; the fundamental frequency of the AC voltage being substantially higher than that of the power line voltage; a gas discharge lamp being disconnectably connected with the AC output; the AC voltage being amplitude-modulated at a low frequency whenever the gas discharge lamp means is disconnected otherwise fails to draw a substantial current from the AC output; the low frequency being substantially lower than the fundamental frequency of the power line voltage.

22. The arrangement of claim 21 wherein, whenever the gas discharge lamp is not connected with the AC output: (i) the RMS magnitude of the AC voltage varies periodically between a minimum level and a maximum level; and (ii) the maximum level being larger than the minimum level by about one third or more.

23. The arrangement of claim 21 wherein the low frequency is higher than about 0.01 Hz but lower than about 10 Hz.

24. An arrangement comprising:
source terminal means across which is provided an ordinary power line voltage; and
ballast means connected with the source terminal means and operative to provide an AC voltage at an AC output; the AC output being operative to connect with and to be properly loaded by a lamp load; the frequency of the AC voltage being substantially higher than that of the power line voltage; the AC voltage being characterized by: (i) whenever the AC output is indeed being properly loaded with a lamp load, being of a substantially constant RMS magnitude; and (ii) whenever the AC output is not being properly loaded, being amplitude-modulated at a frequency lower than that of the power line voltage.

* * * * *